Jan. 1, 1952          H. S. CAMPBELL          2,580,514
ROTATIVE WINGED AIRCRAFT
Filed July 17, 1945                             5 Sheets-Sheet 1
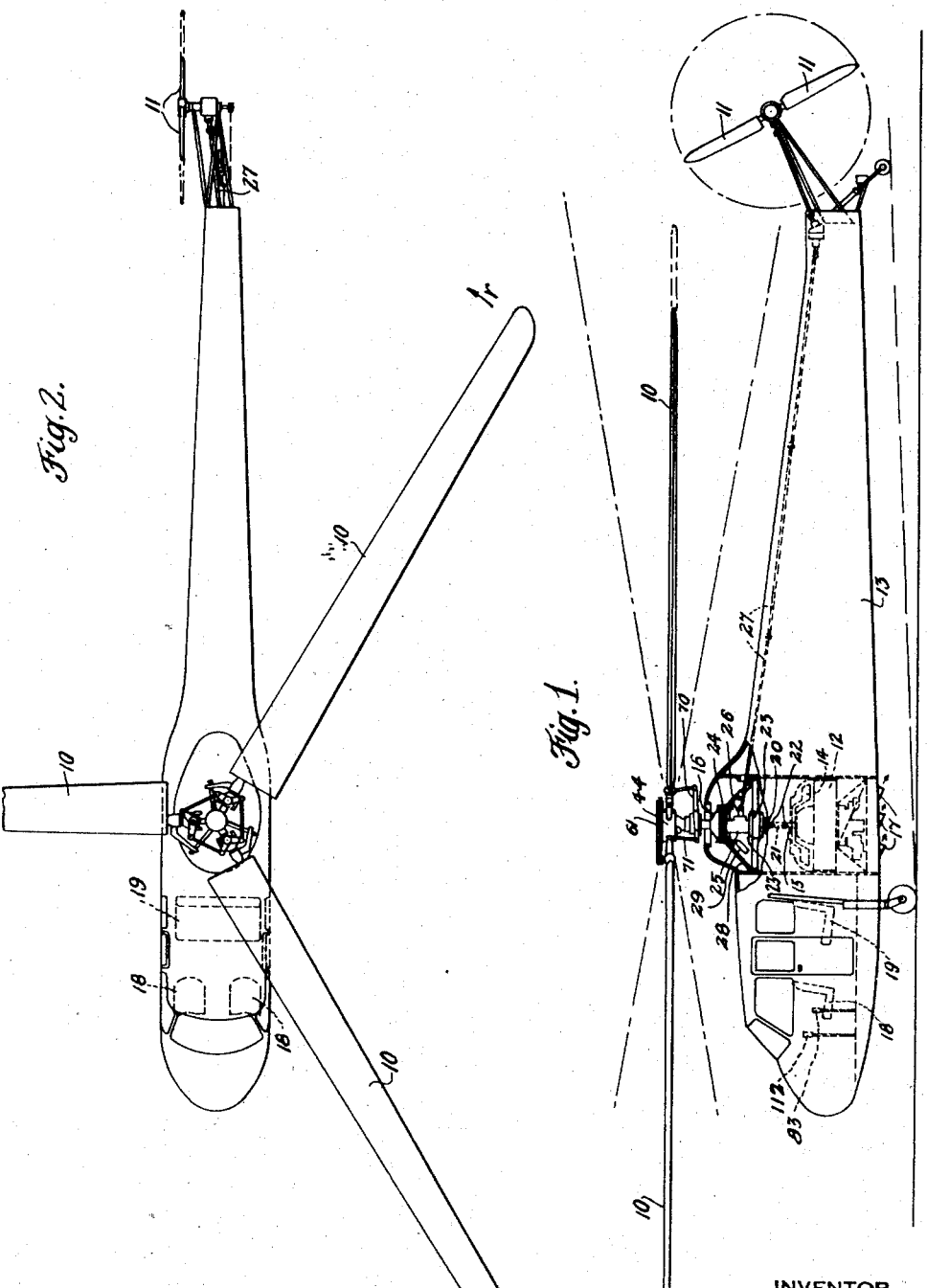
INVENTOR
Harris S. Campbell
BY
ATTORNEYS

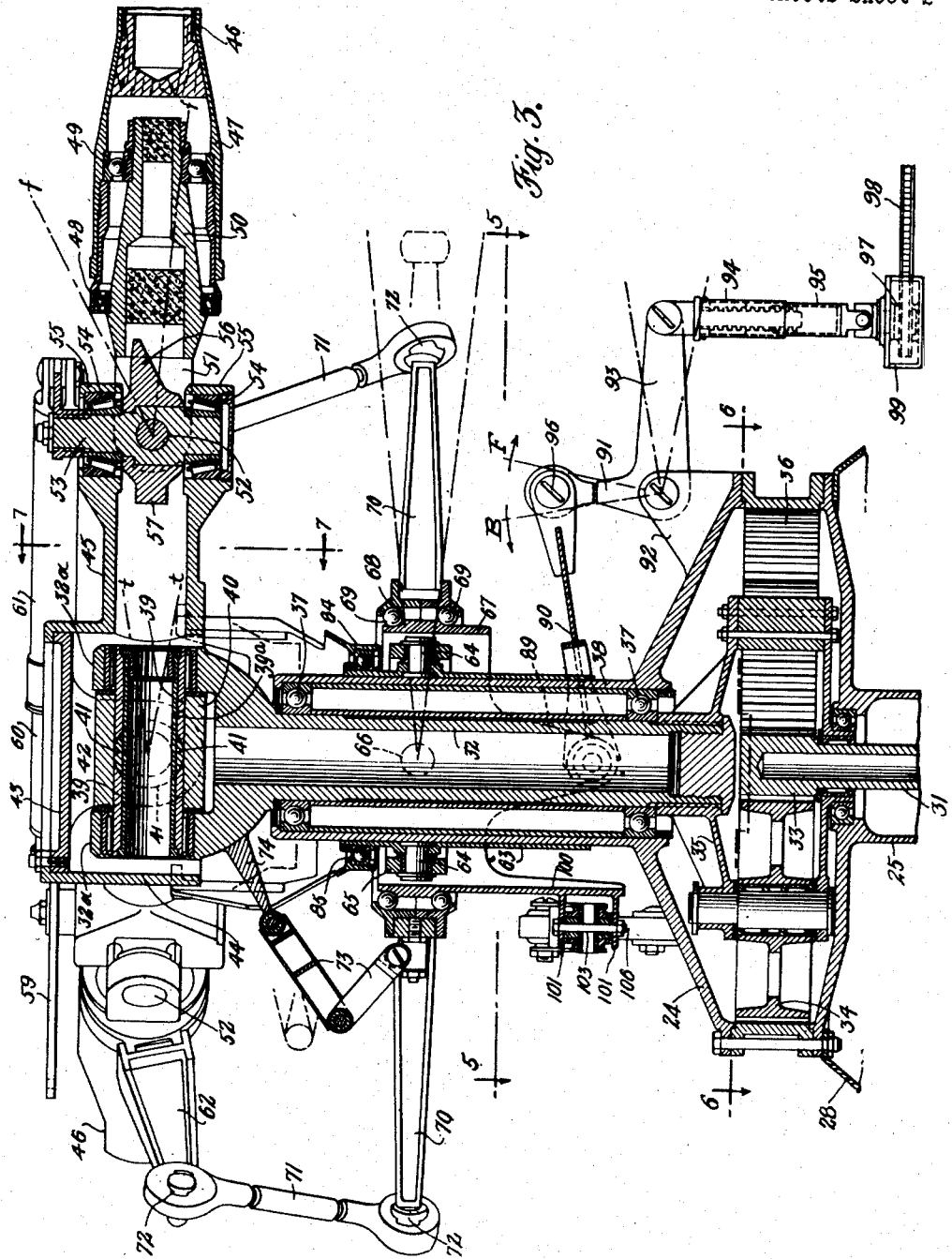

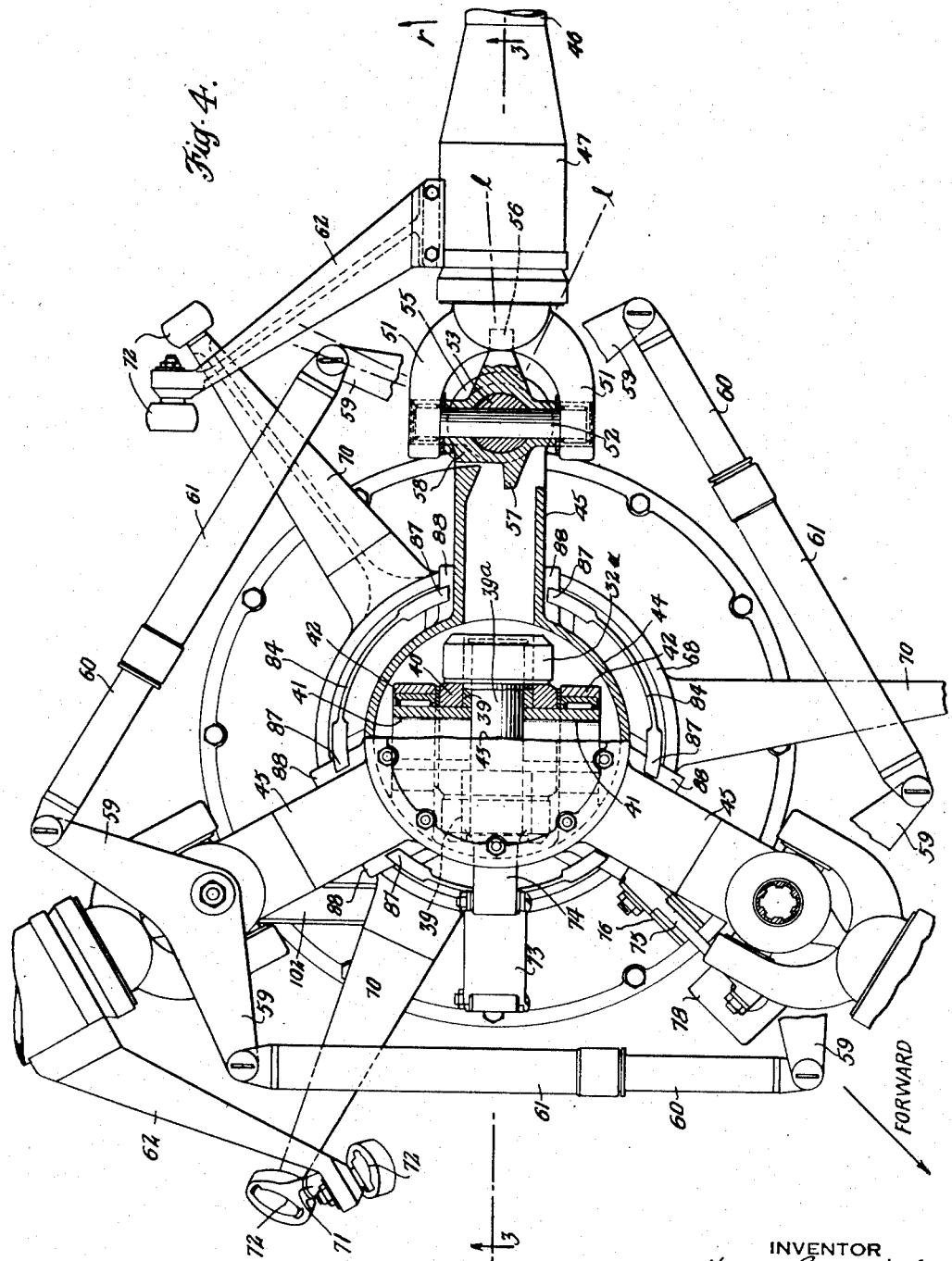

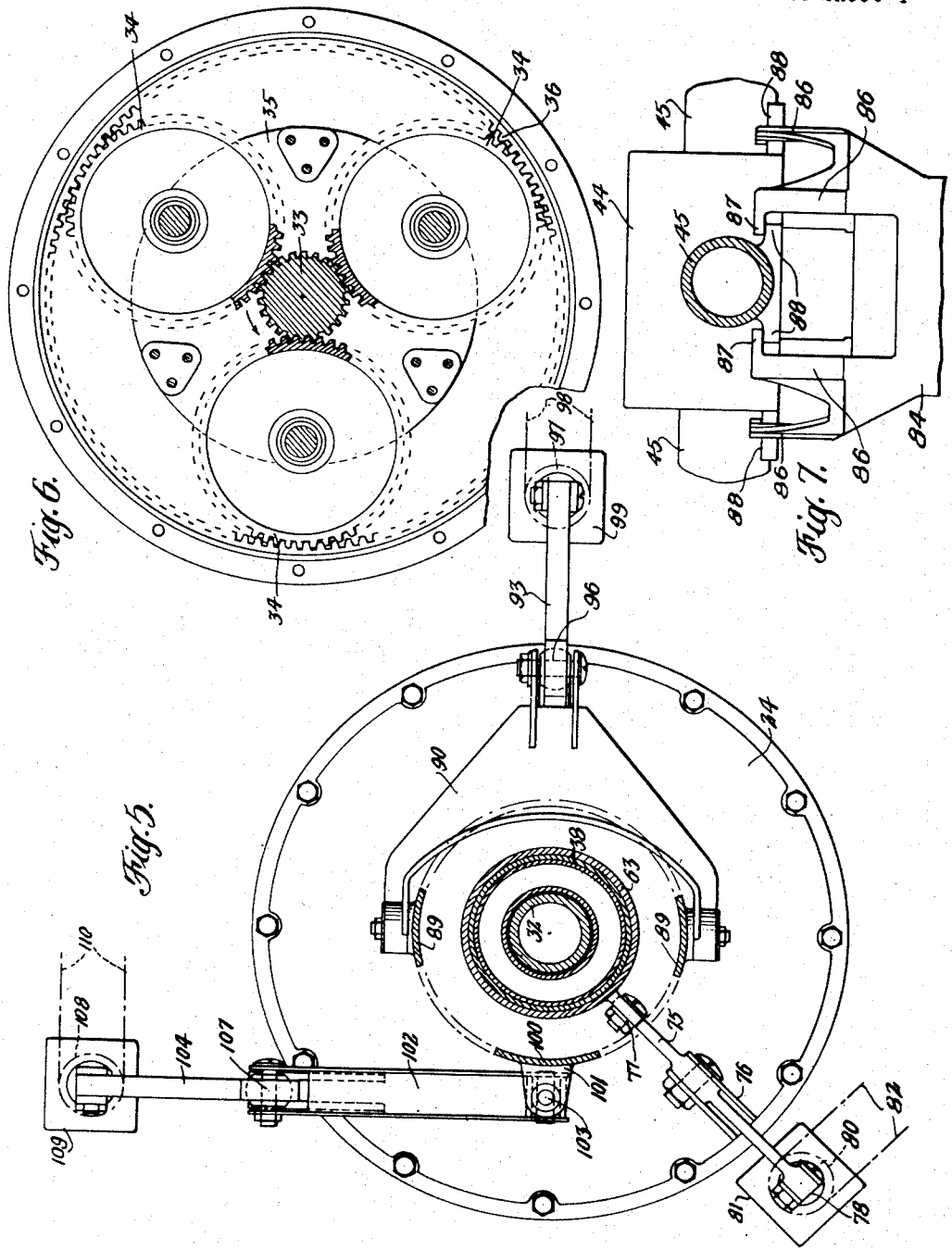

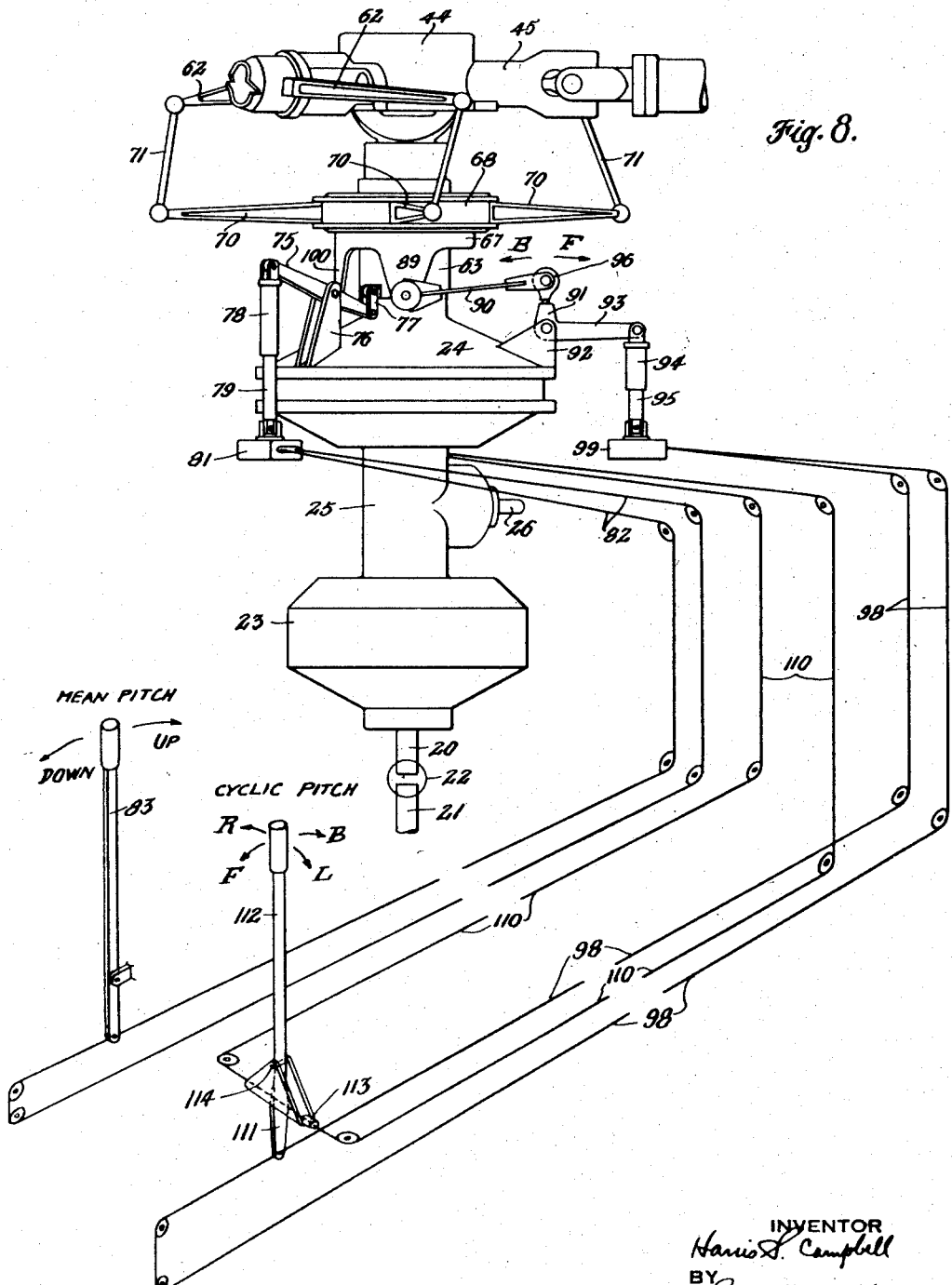

Patented Jan. 1, 1952

2,580,514

UNITED STATES PATENT OFFICE 2,580,514

ROTATIVE WINGED AIRCRAFT

Harris S. Campbell, Bryn Athyn, Pa., assignor to Autogiro Company of America, Philadelphia, Pa., a corporation of Delaware Application July 17, 1945, Serial No. 605,577

10 Claims. (Cl. 170—160.26)

This invention relates to rotative winged aircraft and particularly to improvements in the hub or head structure of an aircraft sustaining rotor. Various features of the invention are useful in rotative winged aircraft of a variety of types having one or more sustaining rotors, either normally power driven or normally autorotative. As will further appear, some features of the invention are especially concerned with the type of rotative winged aircraft incorporating a normally power driven rotor and also incorporating an airscrew for counteracting rotor driving torque. For purposes of illustration, the invention is described hereinafter as applied to this latter type of aircraft.

One of the primary objects of the invention is the provision of a rotor hub or rotor head structure incorporating an improved form of blade mounting including a floating hub member, and further incorporating blade pitch control means arranged to provide automatic stability with respect to floating movement of the hub, so that in a given condition of operation, if a wind gust or other external force tends to disturb the plane of rotation of the floating hub, the pitch angle of the rotor blades is varied in a manner to restore the hub to its original plane of rotation.

Another object of the invention is the provision of an improved pitch control system providing for cyclical pitch variation as well as for alteration of the mean or average pitch of the rotor, various individual features and advantages of which will be pointed out more fully hereinafter.

In accordance with another aspect of the invention, provision is made for restraining or locking out floating movements of the floating hub member when the aircraft is on the ground. In accomplishing this the invention provides a releasable floating hub lock which is controlled in common with the mean pitch of the rotor in such a way that when the mean pitch is reduced to a non-lifting or to a substantially zero value, the lock is automatically applied, the lock being automatically released upon actuation of the pitch control to raise the mean blade pitch, for instance when effecting vertical take-off.

Still another object of the invention is the arrangement of individual flapping and drag pivots for each blade in such manner that the drag pivot for each blade is operatively interposed between the flapping pivot and the floating hub member, the flapping and drag pivot axes, however, being positioned to intersect each other. The configuration of blade mounting pivots and of associated blade mounting parts is further arranged to incorporate limiting stops for both flapping and lag-lead blade movements. In association with the configuration of blade mounting pivots and parts, as just mentioned, the invention further contemplates employment of blade movement control devices, such as dampers for controlling movement of the blades about their drag pivots. By operatively interposing the drag pivots between the flapping pivots and the hub member, the blade dampers or the like may readily be arranged to react directly between the several blades of the rotor without the complication required to accommodate individual flapping movements of the blades.

In accordance with still another aspect of the invention, the rotor hub, power transmission including reduction gearing, clutches and power take-off shaft for driving the anti-torque airscrew constitute an assembly arranged for unitary mounting in the body of the aircraft; the engine, together with a cooling fan therefor, constituting another assembly independently mounted in the body of the aircraft, the two assemblies being adapted for ready coupling to each other.

How the foregoing together with other objects and advantages are attained will appear more fully from the following description referring to the accompanying drawings in which—

Figure 1 is an outline side view of a single rotor helicopter having a torque correcting airscrew at the tail, the aircraft being constructed in accordance with the various features of the invention;

Figure 2 is a plan outline view of the aircraft shown in Figure 1;

Figure 3 is a vertical sectional view, to an enlarged scale, of the rotor head and certain associated parts, this view being taken as indicated by the section line 3—3 on Figure 4;

Figure 4 is a plan view, partly in elevation and partly in horizontal section of the rotor head shown in Figure 3;

Figure 5 is a horizontal sectional view taken as indicated by the section line 5—5 on Figure 3;

Figure 6 is a horizontal sectional view taken as indicated by section line 6—6 on Figure 3;

Figure 7 is a view showing portions of the floating hub mechanism, the view being taken substantially as indicated by line 7—7 on Figure 3; and Figure 8 is an outline view of the rotor hub and power transmission assembly, with a somewhat diagrammatic illustration of the controls associated therewith.

In considering the drawings, attention is first directed to Figures 1 and 2 in which the invention is shown as applied to a helicopter type aircraft having a single generally centralized sustaining rotor incorporating three sustaining rotor blades 10 and also having a torque counteracting tail rotor incorporating a pair of blades 11. The rotor and airscrew are both adapted to be driven from the engine 12 which is mounted in the body 13 on a vertical axis, the engine being provided with a cooling fan 14 mounted on the engine shaft 15 and adapted to circulate air downwardly over the engine, an air intake opening being provided at 16, just below the rotor head, and air outlets at 17, in the bottom of the fuselage. Certain features of the arrangement just described are disclosed and claimed in my copending application, Serial No. 702,523, filed October 10, 1946.

The occupant's compartment is arranged forward of the engine compartment and, in the particular aircraft shown, is provided with pilots' seats 18—18, and an occupant's seat 19.

From Figures 1 and 8 it will be seen that the rotor hub and power transmission assembly is provided with a downwardly extending shaft 20 adapted to be coupled with the engine shaft 15, through a short shaft 21 and a pair of universal joints 22. Shaft 20 serves to deliver power from the engine into the casing 23 which incorporates a manually disconnectible clutch and also an overrunning clutch providing for free rotation of the rotor and of the anti-torque airscrew in the event of engine failure. A second transmission casing appears at 24 which incorporates reduction gearing for the rotor drive, as is described more in detail herebelow with reference to Figures 3 and 6. The two casings 23 and 24 are interconnected by a casing sleeve 25 from which the power take-off shaft 26 extends, the shaft 26 being adapted to be coupled through shafting 27 with the anti-torque airscrew to drive the same.

With the manual clutch and the overrunning clutch disposed in the power transmission line ahead of the power take-off to the anti-torque rotor, it will be understood that the anti-torque rotor will always rotate with the sustaining rotor. It is contemplated that control of the aircraft in yaw be secured by variation of the mean pitch of the anti-torque air-screw, this control being effective either in power driven operation of the sustaining rotor or in free or autorotative operation thereof. The details of such control for the anti-torque airscrew need not be considered herein as they form no part of the present invention per se.

According to the invention the several transmission elements, together with the rotor head, comprise an assembly which is unitarily mounted in the body of the aircraft as by means of a centrally apertured conical support 28 surrounding the transmission assembly, and to which the upper casing part 24 is bolted. Removal of the fastening bolts and disconnection of shafting 21 and 27 permits lifting the entire transmission assembly (including the rotor hub) upwardly from the body, the diameter of the air intake opening 16 and the diameter of the central aperture in the support 28 being large enough to pass the upper and lower transmission casings 23 and 24.

Apertures 29 in the conical wall of the support 28 serve to permit free circulation of air downwardly from the intake 16 to the engine 12.

As best seen in Figures 3 and 6, the power drive to the rotor includes a shaft 31 which is extended upwardly through the casing sleeve 25 into the gear casing 24. Shaft 31 is connected with the rotor drive spindle 32 by means of epicyclic gearing, including a central pinion 33, and a plurality of planet gears 34 mounted by means of a cage 35, the cage being splined to the rotor drive spindle 32 and the planet gears 34 meshing with the internal ring gear 36 which, in effect, forms a part of the gear casing 24. In this way a substantial reduction is effected in the drive to the rotor at a point beyond the power take-off to the anti-torque airscrew. The rotor drive spindle 32 which serves also to support the rotor is mounted by means of bearings 37—37 within a non-rotative supporting sleeve 38 which is rigidly associated with the gear casing 24. The thrust of lift or sustention of the rotor is therefore transmitted from the spindle 32 through the bearings 37 to the sleeve 38 and thence through gear casing 24 to the support 28 and the structural elements of the fuselage (see Figure 1).

At its upper end the spindle 32 is forked as at 32a—32a, the forks being apertured to receive a pivot structure composed of pivot parts 39—39 surrounding the ends of the retainer pin 39a, the parts 39—39 being supported in the universal block 40. As best seen in Figure 4, a pivot 41, through which the retainer pin 39a passes, is also mounted in the universal block 40 and extends into apertures formed in ears 42—42 which depend from the top closure member 43 of the floating hub member 44. The universal joint (32a, 39, 40, 41 and 42) provides for free tilting movement of the floating hub member to various different positions, so that the hub member is therefore free to rotate in various different planes.

In considering the attachment of the blades of the rotor to the floating hub member, it is first noted that the rotor may incorporate a total number of blades different from that illustrated, the particular embodiment of the drawings incorporating three blades. From the standpoint of smoothness of operation of the rotor, particularly when incorporating a freely floating hub, three blades are preferred, but it will be understood that various features of the invention, including for example, features of the individual blade mounting pivots, floating hub locking mechanism, pitch control, etc. are also applicable to rotors incorporating a different number of blades, for example two blades or four blades. Moreover, various features of the blade mounting, pitch control and of other structures are applicable to rotors having fixed spindle hubs, as well as to rotors having floating hubs.

In the illustrated embodiment, with three blades, the floating hub member 44 is provided with three projecting blade mounting stubs 45 equally spaced angularly about the hub. Each blade is connected with one of the stubs 45 by means of individual pivots which are now described with reference to the blade at the right-hand side of Figures 3 and 4. The root end 46 of the blade is enlarged inwardly to form the external part 47 of a pitch mounting. This part is mounted by bearings 48 and 49 on a spindle 50, the axis of the bearings 48 and 49 being substantially coincident with the longitudinal axis of the blade or its spar. The blade is thus mounted for freedom for pitch change movement. The spindle 50 is provided with fork prongs 51—51, these prongs being apertured to receive the flapping pivot pin 52, which pin projects transversely through the drag pivot pin 53 which is journalled by bearings 54—54 in apertured ears 55—55 formed at the outer end of the blade mounting stub 45. The intersecting flapping and drag pivots provide freedom for swinging movement of the blade in the flapping sense (as indicated by the lines f—f in Figure 3) and also freedom for lag-lead movement (as indicated by lines l—l in Figure 4). Limiting stops for these blade movements are associated with the intersecting pivots and include a stop member 56 projecting into the interior of the spindle 50 and serving to define the range of flapping movement f—f. Stop 57 (see particularly Figure 4) projects radially inwardly toward the hub within the hollow stub 45 and serves to define the limit of lag-lead motion in the lagging sense. Stop 58 limits swinging of the blade on the drag pivot in the leading sense, the stops 57 and 58 being arranged to define the range of lag-lead movement above referred to.

It will be understood that the blade swinging movements described just above take place with reference to the floating hub member and thus that the flapping and lag-lead movements are movements in addition to the freedom of motion provided by virtue of the universal or tilting mounting of the floating hub member. In Figure 3 a typical range of tilting movement of the hub is indicated by the lines t—t.

As seen in Figures 3 and 4, a double-ended lever 59—59 is mounted on and splined to each of the drag pivot pins 53. Adjacent arms 59 of adjacent blades are linked together by means of a blade movement control device advantageously in the form of a pair of relatively telescoping elements 60—61. Resistance to relative movement of the elements 60 and 61 may be provided either hydraulically or by friction, as desired. The specific structure of the blade damper itself is not a part of the present invention per se although it is contemplated that the type of resistive force employed be non-rebounding.

In considering the blade damper arrangement it should be noted that the direct interconnection of the actuating arms 59 around the hub provides for damping lag-lead movements of the blades with relation to each other, without, however, appreciably resisting conjoint lag or lead movement of all blades in the same sense to the same degree. Moreover, since the drag pivots for the blades are operatively interposed between the flapping pivots and the hub, and since the dampers operate through levers 59 connected with the drag pivots, simple pivot connections are all that is needed between the dampers and the levers 59. Certain features of the blade movement control arrangement just described are disclosed and claimed in my copending application, Serial No. 702,524, filed October 10, 1946.

For purposes of control of the rotor blade pitch each blade is provided with a control arm 62 which is secured to the external part 47 of the pitch mounting and projects inwardly and forwardly therefrom, with respect to the direction of rotation of the rotor (see arrow r in Figure 4). This arm is moved upwardly or downwardly by pitch control mechanism which is described below with particular reference to Figures 3, 4, 5 and 8.

Referring now to Figure 3, a non-rotative sleeve 63 surrounds the rotor supporting sleeve 38 and is vertically movable thereon. Sleeve 63 carries a pair of aligned trunnion parts 64—64 which serve to support a gimbal ring 65, with which an additional pair of trunnion parts 66 is associated, one such appearing in Figure 3, and the two being aligned along an axis transverse to the axis of parts 64—64. Parts 66—66 cooperate with the non-rotative ring 67, and the gimbal assembly just described provides for free tilting movement of ring 67 in all directions. A rotative swash ring 68 is mounted on ring 67 by means of bearings 69 and the ring 68 is provided with three projecting control arms 70, one for each of the three blades of the rotor. The pitch control arm 62 of each blade is connected with one of the arms 70 by means of a generally upright link 71 provided at both ends with ball or universal joints 72.

From the above it will be seen that either vertical displacement or tilting movement of the rotative ring 68 will vary the pitch of the rotor blades, the vertical movement providing for variation of mean pitch of all of the blades in the same sense, and the tilting movement effecting a cyclical variation of blade pitch in a sense described more fully herebelow. Rotation of ring 68 with the rotor is assured by means of a scissors linkage 73 (see Figures 3 and 4) which is connected at one end to the ring 68 by a universal joint and at the other end by a simple pivot to an arm 74 projecting laterally from the rotative hub spindle.

The controls for effecting vertical and tilting movements of the swash ring 68 are shown in Figures 3, 4, 5 and 8. As best seen in Figures 5 and 8, the control for moving the sleeve 63 and thus the ring 68 vertically, includes a lever 75 pivoted intermediate its ends on brackets 76 carried by the housing 24, the inner end of the lever being coupled by means of links 77 with an apertured lug projecting from the sleeve 63. The upper and lower ends of links 77 are connected with the associated parts by joints providing some lost motion in a sense affording limited freedom for angular turning of the sleeve 63 about the axis of the spindle 32. This lost motion is provided to accommodate various control movements described below. The outer end of lever 75 is connected with a multi-part link 78—79 incorporating complementarily threaded internal and external screw parts, the lower end of link part 79 being connected with a pulley or the like 80 which is mounted for rotation in the fixed supporting box 81. A closed circuit cable 82 is adapted to actuate the pulley 80 and thus rotate the lower link part 79, the effect of which is to cause the upper link part 78 to move upwardly or downwardly and thus cause the sleeve 63 and the swash ring 68 carried thereby to move downwardly or upwardly. Cable 82 is adapted to be actuated by the mean pitch control lever 83, the sense of threading between the link parts 78 and 79 and the arrangement of the cable and lever preferably being such that rearward movement of the lever effects increase of mean blade pitch and forward movement of the lever effects decrease of mean blade pitch. A control stick 83 hooked up in this sense is illustrated in Figure 8.

When the sleeve 63 is caused to move upwardly or downwardly by the mean pitch control lever, a similar motion is imparted to the floating hub locking mechanism which includes a sleeve part 84 (see particularly Figures 3 and 7) which is rotatively mounted on the sleeve 63 by means of the bearing 85. The sleeve 84 is provided with three pairs of upstanding elements 86—86 provided with laterally projecting stop members 87 which are adapted to engage the flanges 88—88 which project laterally from each of the blade mounting stubs 45. The floating hub locking parts 84 to 87 inclusive, are all rotatable with the rotor and are movable vertically with the sleeve 63, so that when the mean pitch control lever 83 is adjusted to increase or decrease the mean blade pitch, the stop members 87 are caused to move upwardly or downwardly. The arrangement of these parts is such that when the mean pitch control lever is moved to a non-lifting or zero pitch position, the stop members 87 are drawn downwardly sufficiently to engage the flanges 88 which project from the blade mounting stubs, thereby locking the floating hub member as against floating movement. In this way when the aircraft is on the ground the tilting of the floating hub may readily be locked out. In making a landing, as soon as the craft has come to rest on the ground the pilot would normally reduce the mean blade pitch in order to avoid undesired re-take-off, and in effecting this maneuver the floating hub is automatically locked. Similarly, when a take-off is being made, after the rotor has been accelerated to an appropriate take-off R. P. M., the pilot would normally move the mean pitch control lever to increase the pitch of the rotor so as to effect take-off, and this control motion of the mean pitch control lever is accompanied by release of the locking mechanism, so that the rotor system is conditioned for proper flight operation.

Turning now to the controls for the cyclical or differential pitch variation of the rotor blades, attention is first directed to Figures 3 and 5 from which it will be seen that the non-rotative (but tiltable) ring 67 is provided with a pair of downwardly projecting ears 89—89 to which a yoke member 90 is pivoted. The yoke member constitutes a link adapted to be moved to the left or to the right, when viewed as in Figures 3 and 5, so as to tilt the ring 67 and thus the rotative swash ring 68 about the axis of the tilting trunnions 66. This motion is imparted to the yoke or link member 90 by connection of the free end thereof with one arm 91 of a bell-crank which is pivotally mounted on supporting ears 92, the other arm 93 of the bell-crank being connected with a multi-part link 94—95, incorporating co-operating internally and externally threaded elements so that rotation of part 95 causes the part 94 to move upwardly or downwardly. A ball or universal joint 96 is provided between the link 90 and arm 91 of the bell-crank for a purpose to be described hereinafter.

As shown in Figure 3, the lower end of link part 95 is associated with a sprocket 97, with which a short length of chain 98 cooperates, the sprocket being mounted in a fixed supporting box 99. These parts are diagrammatically illustrated in Figure 5 and in connection therewith it should be understood that either a chain-and-sprocket or cable-and-pulley arrangement may be employed for this purpose. Similarly, the mean pitch control may be effected by employment of a chain-and-sprocket connection in place of the pulley-and-cable connection 80—82 illustrated in Figure 5. In the event of employment of a short length of chain adjacent the multi-part threaded link devices, it is contemplated that lengths of cable will be extended therefrom to the controls in the cockpit of the aircraft (see Figure 8 and description herebelow).

For the purpose of tilting the non-rotative ring 67 and thus the rotatable swash ring 68 about the axis of trunnions 64—64, the ring 67 is provided with a depending part 100 provided with a pair of laterally projecting ears 101—101 to which one end of a link 102 is connected as by means of a universal joint 103. Motion is imparted to link 102 axially thereof by means of a bell-crank and multi-part screw threaded link of essentially the same type as described above (reference numerals 91 to 95 inclusive). The horizontal arm of this bell-crank appears at 104 in Figure 5 and the upright arm appears at 106 in Figure 3. A universal or ball type joint 107 is provided between the link 102 and the upright bell-crank arm 106. Upward and downward swinging motion of bell-crank arm 104 is provided for by the multipart screw threaded link associated therewith in the same general manner as described above with reference to the control elements 97, 98 and 99 in Figure 3.

In the case of the screw threaded link device associated with bell-crank lever 104, the rotative motion is provided for by means of a pulley or sprocket 108 mounted in a fixed supporting box 109, the pulley or sprocket being associated with a cable or chain 110.

The ball or universal joints (96, 103 and 107—see Figure 5) associated with the bell-crank arms 91 and 106 and with the links 90 and 102, are provided to accommodate the various tilting motions which occur when the swash member is being concurrently tilted on the two axes defined by trunnions 64 and 66. The extension of links 90 and 102 for an appreciable distance in a generally horizontal plane minimizes the effect of one control on the other. When the link 102 is actuated the tilt of the non-rotative and rotative swash rings 67 and 68 takes place substantially about the axis of trunnions 64—64, the motion of the depending control ear 100 being constrained to occur in a somewhat arcuate path about a center point defined by the ball joint 96 of the other set of control connections. This arcuate motion is accompanied by slight rotation of the gimbal mounting sleeve 63, and such rotation is accommodated by the lost motion connection associated with ends of links 77 of the mean pitch control connections.

In considering the orientation of the control hookup providing for tilting movements of the swash ring so as to shift the lift line of the rotor laterally and longitudinally for lateral and longitudinal control of the aircraft, it is first pointed out that Figure 8 illustrates both the rotor mount and the control system as viewed from a left, forward position, i. e., looking toward the rotor mount and controls in a direction approximately diametrically opposite to the arrow applied at the lower left corner of Figure 4, which arrow, in Figure 4 identifies the "Forward" direction. With this in mind, it will be seen, particularly from Figure 4, that the mean pitch control lever 75 extends forwardly from the rotor hub substantially in the longitudinal vertical midplane of the aircraft. It will also be seen that the lateral control link 102 and the longitudinal control link 90 extend rearwardly from the rotor mount in directions diverging to the right and to the left, respectively, from the longitudinal vertical mid-plane (a plane containing the arrow labeled "Forward" in Figure 4). As a result, actuation of the longitudinal control link 90 causes the swash ring 68 to tilt about a horizontal axis intersecting the rotor axis and extended at an angle of approximately 45° from the longitudinal vertical mid-plane, the divergence being to the left of said plane ahead of the rotor axis and to the right of said plane rearwardly of the rotor axis. On the other hand actuation of the lateral control link 102 causes the swash ring 68 to tilt about a horizontal axis intersecting the rotor axis and extended at an angle of approximately 45° from the longitudinal vertical mid-plane, but with the divergence being to the right of said plane ahead of the rotor axis and to the left of said plane rearwardly of the rotor axis.

With pitch control arms 62 extended (as shown in Figure 4) forwardly from the blade roots to a region angularly spaced in advance of the longitudinal blade axes by approximately 45°, the above described sense of tilting of the swash ring 68 results in cyclical pitch variation (upon actuation of the lateral or longitudinal controls) in such sense that longitudinal control actuation causes the blades to attain maximum and minimum pitch as they pass through advancing and retreating positions located approximately transversely of the aircraft, i. e., approximately at right angles to the longitudinal vertical mid-plane. Lateral control actuation causes the blades to attain maximum and minimum pitch as they pass through positions at the front and rear of the machine, i. e., positions lying substantially in the longitudinal vertical mid-plane of the aircraft.

The cable system for controlling the longitudinal and lateral tilting movement of the swash ring is illustrated in Figure 8, from which it will be seen that the longitudinal control cable 98 is arranged in a closed circuit associated with the downward projection 111 of the cyclical pitch control lever 112, the lever being mounted for fore-and-aft tilting movement as by pivots one of which appears at 113. The control stick is also mounted for lateral movement as by a pivot 114 and the cable 110 is associated with the control stick below the pivot 114 in the manner of a closed circuit, so that movement of the control stick to the right or to the left (as indicated by the arrows in Figure 8) actuates the cable 110.

The control cables just described and the lateral and longitudinal pitch control levers, links, etc., are so arranged that the points of maximum pitch increase and maximum pitch decrease take place in the senses mentioned just below. Assuming forward flight of the aircraft, forward movement of the control stick 112 causes the blades to attain maximum decrease of pitch as they pass on the advancing side of the rotor, and maximum increase of pitch as they pass on the retreating side, substantially diametrically opposite to the position of maximum pitch decrease. Backward movement of the control stick causes the blades to attain maximum increase of pitch as they pass on the advancing side of the rotor and maximum decrease of pitch as they pass on the retreating side. The longitudinal control secured in this way is "instinctive," resulting in a nose-down moment upon forward movement of the control stick and a nose-up moment upon backward movement of the control stick.

With respect to lateral control, with a rotor rotating in the direction indicated by the arrow r in Figure 4, movement of the control stick to the right causes the blades to attain maximum increase of pitch when the blades pass at the front of the machine and maximum decrease of pitch when the blades pass at the rear; and conversely when the control stick is moved to the left the blades attain maximum decrease of pitch as they pass at the front and maximum increase when they pass the rear position. This also achieves "instinctive" control and results in a banking moment to the right when the control stick is moved to the right, and a banking moment to the left when the control stick is moved to the left.

The above described cyclical pitch variation for purposes of control for maneuvering of the aircraft constitutes one general type of cyclical pitch variation which is achieved by the mechanism of the present invention, it being pointed out that the pitch control connections and the mounting of the hub for free floating to and rotation in different planes provides for another type of cyclical pitch variation which takes place automatically during translational flight or during the existence of any other external influence, such as an "air bump," tending to alter or disturb the mean plane of rotation of the rotor and its hub. The two types of cyclical pitch variation (manually controlled, and automatically set up) are, under various conditions of flight, superimposed one upon the other.

The second or automatic type of cyclical pitch variation occurs as a result of tilting movement of the floating hub with reference to the plane of rotation of the swash ring 68. When this occurs, for example when the floating hub tilts downwardly at the forward edge, the blades experience a cyclical pitch variation, attaining a maximum pitch increase as the blades pass the forward position and a maximum pitch decrease as the blades pass the position at the rear of the circle of rotation. Similarly, if the floating hub tilts downwardly at the advancing side (at the right-hand side of the aircraft, with a direction of rotor rotation such as indicated in Figure 4), a cyclical pitch variation is automatically set up, with the blades attaining maximum pitch increase as they pass on the advancing side of the rotor and a maximum pitch decrease as they pass at the retreating side. It may be mentioned that the sense of automatic cyclical pitch variation here described is defined with relation to a plane of reference fixed with respect to the aircraft, for instance a plane perpendicular to the axis of the non-tilting rotor mounting spindle 32. The automatic cyclical pitch variation here discussed may alternatively be defined in terms of maximum pitch increase and maximum pitch decrease with relation to the instantaneous plane of rotation of the floating hub member, in which event the points in the circle of rotation where maximum pitch increase and maximum pitch decrease occur must be differently defined, i. e., as follows.

Because of the extension of the pitch control arms 62 forwardly of the blade roots, if the automatic cyclical pitch variation is measured with relation to the instantaneous plane of rotation of the floating hub, if the floating hub tilts downwardly at a given azimuth or position in the circle of rotation, the blades will experience maximum increase of pitch as they pass a point approximately 45° behind (i. e., trailing) the azimuth of downward tilt of the hub; the point of maximum pitch decrease being diametrically opposite.

In any event, regardless of the method of definition of the automatic cyclical pitch variation, the effect of the automatic cyclical pitch variation tends to "centralize" the mean plane of rotation of the rotor and its hub and to automatically compensate or correct for disturbing influences, such as air bumps.

Another feature to be noted is here mentioned with reference to Figure 4. As hereinabove described, the drag pivot pin 53 provides freedom for lag-lead movement of the blade, desirably through a range such as that indicated by the lines l—l. It will be noted that considerably greater freedom is provided for in the lagging sense than in the leading sense, the reason for this being that power drive of the rotor through the hub normally causes considerable lagging movement of the blades; whereas, in autorotative flight, which is also contemplated according to the invention (at least for purposes of descent without power), the mid-position of the blade with reference to lag-lead displacements approximates a truly radial position. From examination of the positions of the blade pitch control arms 62 and of the swash ring arms 70, it will be noted that when a blade is in truly radial position the free end of arm 62 lies somewhat ahead of the free end of arm 70. Under conditions of power drive the blade lags appreciably, and in this condition the free end of arm 62 shifts rearwardly with respect to the free end of arm 70. With the range of lag-lead motion indicated, the free end of arm 70 is noticeably behind the free end of arm 62 when the blade is in radial (or autorotative) position, but in the average position of power drive, the free end of arm 62 is located substantially vertically above the free end of arm 70, so that in the condition of power drive lag-lead movements of the blade do not appreciably alter the operation of the pitch control. However, when the condition of operation changes from that of power drive to that of autorotative flight, an appreciably automatic decrease of blade pitch occurs automatically as the blades swing forwardly to the radial position, which is of advantage since, in general, a lower pitch is desired for autorotative operation than for power driven operation.

Another advantageous feature of the arrangement disclosed is the location of the free end of the pitch control arm 62 close to a position along the axis of the flapping pivot 52 for the blade. In Figures 3 and 4, the mean pitch control and the connections extended to the blades are shown adjusted to the zero pitch position. In this position (see the left-hand side of Figure 3) the free end of the arm 62 is just a little below the axis of the flapping pivot 52. When the pitch is increased to a positive value suitable for flight operation, the free end of arm 62 lies close to or a little above a horizontal plane containing the flapping pivot axis 52.

Because of the location of the free end of the pitch control arm 62, as just described, flapping movements of the blade about the flapping pivot 52 take place without introducing any appreciable pitch change of the blade. However, tilting or floating of the hub and rotation thereof in a plane out of parallelism with that of the swash ring 68 automatically introduces a pitch correction tending to bring the plane of rotation of the hub back into parallelism with the plane of rotation of the swash ring 68.

In conclusion it is mentioned that the employment of the floating hub as above described, particularly in association with the intersecting flapping and drag pivots for mounting the blades on the hub, and with the control system, is highly effective in providing smoothness in rotor operation under various conditions of flight. The arrangement, moreover, is of advantage in minimizing the transmission of undesirable vibrations or "shakes" to the control stick, and also in minimizing the effects of air bumps or other disturbances.

I claim:

1. In an aircraft, a rotor comprising a hub member mounted to rotate about a generally upright axis, radially extending blades each having a root end mounting member, mechanism for each blade for pivotally interconnecting the hub member and said mounting member to provide for pivotal movement of the blade as a whole with respect to the hub, said pivot mechanism for each blade including a flapping pivot and a pitch change pivot, controllable means for positively shifting the blades each as a unit on its pitch change pivot, including a control member rotative with the rotor, means mounting the hub member for tilting movement to and rotation in different planes irrespective of the plane of rotation of said control member, and actuating connections between the control member and the root end mounting members of the several blades including, for each blade, a control arm extended from the root end mounting member for the blade generally in the rotative path of travel thereof to a position angularly offset from the blade substantially less than 90°, to provide for automatic variation of blade pitch upon tilting movement of the hub member.

2. In an aircraft, a rotor comprising a hub member mounted to rotate about a generally upright axis, radially extending blades each having a root end mounting member, mechanism for each blade for pivotally interconnecting the hub member and said mounting member to provide for pivotal movement of the blade as a whole with respect to the hub, said pivot mechanism for each blade including a flapping pivot and a pitch change pivot, controllable means for positively shifting the blades each as a unit on its pitch change pivot, including a control member rotative with the rotor, means mounting the hub member for tilting movement to and rotation in different planes irrespective of the plane of rotation of said control member, and actuating connections between the control member and the root end mounting members of the several blades including, for each blade, a control arm extended from the root end mounting member for the blade generally in the rotative path of travel thereof to provide for automatic variation of blade pitch upon tilting movement of the hub member, in a sense effecting decrease of rotor blade pitch angle toward that side of the rotor on which the hub member tilts upwardly and increase of the rotor blade pitch angle toward that side of the rotor on which the hub member tilts downwardly.

3. In an aircraft, a sustaining rotor comprising a rotative hub member mounted for tilting to and rotation in different planes, blade means connected with the hub member and arranged for variation in mean effective pitch angle, adjustable control means for regulating the mean pitch angle of the blades, and means operated by adjustment of said control means to lock the hub member as against tilting movement.

4. A construction according to claim 3 in which the mean rotor blade pitch angle is adjustable over a range including approximately zero effective pitch, and in which the means for locking the hub member, as against tilting movement, is effective to so lock the hub member upon adjustment of the pitch regulating means to the substantially zero pitch setting.

5. In an aircraft, a sustaining rotor comprising a rotative hub member mounted for tilting to and rotation in different planes, blade means connected with the hub member by flapping and pitch change pivots, means associated with the blades and the tiltable hub member for restraining the blades as against excessive downward swinging movement on the flapping pivots, adjustable control means for regulating the mean pitch angle of the blades, and means operated by adjustment of said control means to lock the hub member as against tilting movement.

6. In an aircraft, a sustaining rotor comprising a rotative hub member mounted for tilting to and rotation in different planes, blade means connected with the hub member with freedom for flapping movement with respect thereto, means associated with the blades and the tiltable hub member for restraining the blades as against excessive downward swinging movement, and controllable means for locking the hub member as against tilting movement.

7. A construction in accordance with claim 6 in which the aircraft is further provided with a normal flight control organ manipulable by the pilot for maneuvering purposes adjustable to a point beyond normal flying range and means operated by adjustment of said flight control organ to said point beyond normal flying range to effect locking of the hub member as against tilting movement.

8. In an aircraft, a sustaining rotor comprising a rotative hub, a blade connected with the hub by three pivotal mountings providing, respectively, for lag-lead, flapping and pitch change movement, the pivotal mounting providing for flapping movement being operatively interposed between the other two pivotal mountings, and the pivotal mounting providing for pitch change being located outboard of the other two, mechanism for varying the blade pitch angle including a member rotatable with the rotor, means mounting the hub for tilting to and rotation in different planes irrespective of the plane of rotation of said member, and actuating connections between the blade and said rotatable member providing for cyclical variation of blade pitch when the plane of rotation of the hub is angled with respect to the plane of rotation of said rotatable member, said actuating connections including a flexible joint positioned in alignment with the axis of the pivotal mounting providing for blade flapping, whereby blade flapping with respect to the hub does not appreciably alter the blade pitch established by the mechanism for varying the blade pitch.

9. In an aircraft, a sustaining rotor comprising a rotative hub, a blade connected with the hub with freedom for pitch change movement, mechanism for varying the blade pitch angle including a member rotatable with the rotor, means mounting the hub for tilting to and rotation in different planes irrespective of the plane of rotation of said member, and actuating connections between the blade and said rotatable member providing for cyclical variation of blade pitch when the plane of rotation of the hub is angled with respect to the plane of rotation of said rotatable member, said actuating connections being arranged to effect cyclical blade pitch change in such sense that when the plane of rotation of the hub is tilted downwardly toward any angular position in the general circle of rotation of the rotor the blade experiences maximum increase of pitch, with relation to a horizontal plane fixed with respect to the aircraft, when the blade passes through the same azimuthal position as the position of downward tilt of the hub.

10. In an aircraft, a sustaining rotor comprising a rotative hub, a blade connected with the hub with freedom for pitch change movement, mechanism for varying the blade pitch angle including a member rotatable with the rotor, means mounting the hub for tilting to and rotation in different planes irrespective of the plane of rotation of said member, and actuating connections between the blade and said rotatable member providing for cyclical variation of blade pitch when the plane of rotation of the hub is angled with respect to the plane of rotation of said rotatable member, said actuating connections being arranged to effect cyclical blade pitch change in such sense that when the plane of rotation of the hub is tilted downwardly toward any angular position in the general circle of rotation of the rotor the blade experiences maximum increase of pitch with relation to the instantaneous plane of rotation of the hub when the blade passes through a position angularly trailing the position of downward tilt of the hub, and said actuating connections further being arranged to effect said maximum increase of pitch when the blade passes through a position angularly trailing the position of downward hub tilt by an angle in the neighborhood of 45°.

HARRIS S. CAMPBELL.

REFERENCES CITED

The following references are of record in the file of this patent:

UNITED STATES PATENTS

| Number | Name | Date |
|---|---|---|
| 1,919,089 | Breguet et al. | July 18, 1933 |
| 1,986,709 | Breguet et al. | Jan. 1, 1935 |
| 2,030,578 | Flettner | Feb. 11, 1936 |
| 2,074,805 | Platt | Mar. 23, 1937 |
| 2,311,247 | Pitcairn | Feb. 16, 1943 |
| 2,376,523 | Synnestvedt | May 22, 1945 |
| 2,380,580 | Cierva | July 31, 1945 |
| 2,432,677 | Platt | Dec. 16, 1947 |